July 18, 1961  M. M. KARLSBERG  2,992,485
ELLIPTIC COMPASS
Filed Jan. 14, 1960
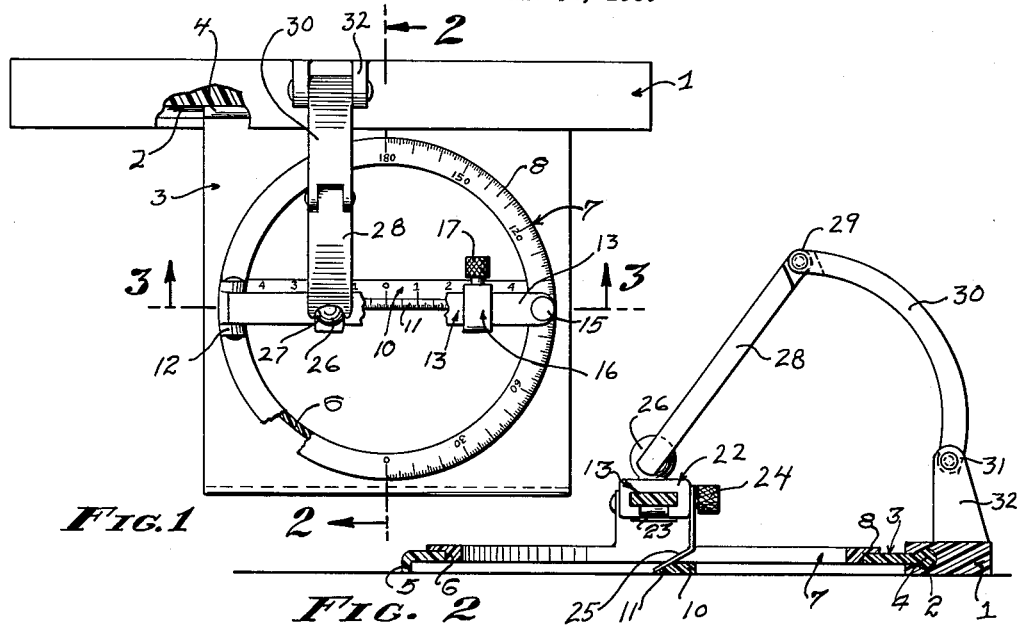
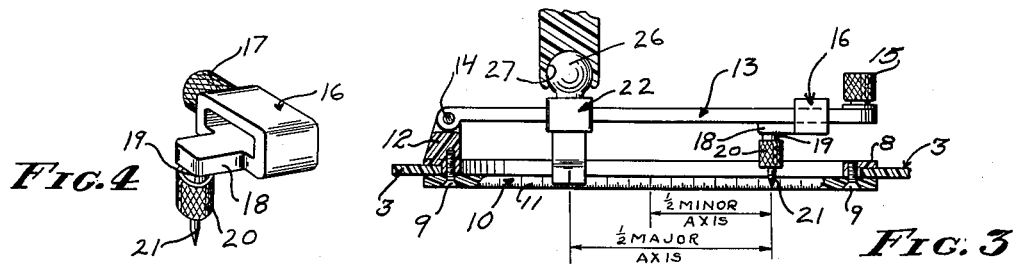
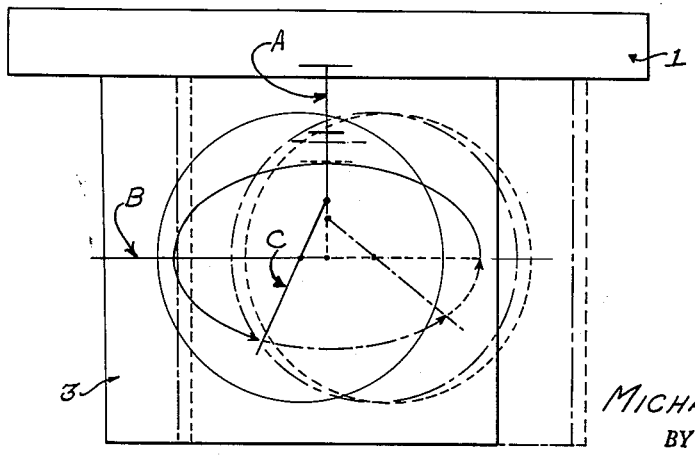
INVENTOR.
MICHAEL M. KARLSBERG
BY Lyon & Lyon
ATTORNEYS

United States Patent Office 2,992,485
Patented July 18, 1961

2,992,485
ELLIPTIC COMPASS
Michael M. Karlsberg, Los Angeles, Calif., assignor to Edward Karlsberg, Los Angeles, Calif.
Filed Jan. 14, 1960, Ser. No. 2,527
6 Claims. (Cl. 33—31)

This invention relates to elliptic compasses, and included in the objects of this invention are:

First, to provide an elliptic compass which permits the drawing of accurate and complete ellipses of any major-minor axis ratio and any size within the capacity of the compass.

Second, to provide an elliptic compass which may be quickly and accurately adjusted for drawing various ellipses.

Third, to provide an elliptic compass which is compact, involving a minimum number of parts, and which is inexpensive to manufacture.

With the above and other objects in view, as may appear hereinafter, reference is directed to the accompanying drawings in which:

FIGURE 1 is a plan view of the elliptic compass with a portion shown in section;

FIGURE 2 is an enlarged sectional view taken through 2—2 of FIGURE 1;

FIGURE 3 is an enlarged sectional view taken through 3—3 of FIGURE 1;

FIGURE 4 is a further enlarged perspective view of the scribe slide;

FIGURE 5 is a diagrammatical view illustrating the movement of the parts in order to describe an ellipse.

The elliptic compass includes a guide bar 1 which serves as a fixed reference member and may be secured to the surface on which the compass is placed, or held in place against a drafting machine rule or other straight edge, or may be arranged for attachment to a drafting machine in place of the conventional drafting machine rule.

One longitudinal edge of the guide bar 1 is provided with a guide groove 2 enlarged at its inner portion. A base plate 3 is provided, along one margin of which is formed a rib 4 adapted to ride in the guide groove 2 so that the plate 3 may be moved back and forth parallel to the bar 1. The extended margin of the base plate 3 is provided with a downturned flange 5, which rests on the same surface as the bar 1 and supports the plate parallel to such surface and separated slightly therefrom.

The base plate 3 is provided with a large, circular aperture 6 which journals a protractor ring 7 having a marginal flange 8 overlying the base plate 3. The upper surface of the protractor ring is provided with a protractor scale.

Secured to the underside of the protractor ring 7 by screws 9 is a scale bar 10, one edge of which is beveled as indicated by 11. The beveled edge 11 is closely adjacent a diameter of the protractor ring 7. The extremities of the scale bar 10 project under the base plate 3 to retain the protractor ring on the base plate but permit its rotation. The under surface of the scale bar 10 is substantially coplanar with the flange 5 and the underside of the bar 1 so as to rest on the same surface therewith, or be disposed slightly above the surface of the paper to permit the drawing of ellipses in ink. At one location in its periphery, the protractor ring 7 is provided with an upwardly directed boss 12 which journals a cross arm 13 by means of a pivot pin 14. The cross arm 13 extends diametrically across the protractor ring 7 parallel to the scale bar 10. The extremity of the cross arm 13 is provided with a knob 15.

Mounted on the cross arm 13 is a scribe-carrying slide 16 which encompasses the cross arm and is provided with a set screw 17. At its underside the slide 16 is provided with a tongue 18 extending longitudinally of the cross arm 13. The tongue 18 is provided with a depending stem 19 which carries a ferrule 20. The stem and ferrule are arranged to hold a scribing member 21, such as a pencil or pen.

Also mounted on the cross arm 13 is a second slide 22 which partially encompasses the cross arm but is provided with a slot 23 which clears the tongue 18 of the first slide 16. The second slide 22 may be adjusted on the cross arm 13 by a set screw 24. A suitable pointer 25 extends downwardly from the slide 22 for cooperation with a scale provided along the beveled edge 11 of the scale bar 10. The scribing member 21 is also disposed adjacent this scale.

The slide 22 is provided at its upper side with a ball 26 which universally journals a yoke 27 at one end of an arm 28. The arm 28 is connected by a hinge pin 29 to a second arm 30 which is preferably arcuate in form. The second arm is in turn connected by a hinge pin 31 to a boss 32 extending upwardly from the bar 1. The hinge connections between the arms 28 and 30 and between the arm 30 and the boss 32 are such as to minimize any side play so that the slide 22 is constrained to a translation movement at right angles to the translation movement of the base plate 3.

Operation of the elliptic compass is as follows:

The scribe-carrying slide 16 is moved along the cross arm 13 until the scribing member 21 is displaced one-half the minor axis of an ellipse to be drawn from the center of the protractor ring 7. The center of the protractor ring corresponds to the zero point of the scale on the scale bar 10. The second slide 22 is moved until its pointer 25 (which lies in the vertical axis through the ball 26) is displaced from the scribing member 21 a distance equal to one-half the major axis of the ellipse to be drawn. After these adjustments are made, rotation of the protractor ring 7 and cross arm 13 causes the scribing member 21 to describe an ellipse, as shown diagrammatically in FIGURE 5.

It will be noted with respect to FIGURE 5 that the slide 22 moves in a linear translation path A which is perpendicular to the fixed reference bar 1. The center of the ellipse moves along a translation axis B which is parallel to the bar 1. The axis of the ball 26 thus remains on the minor axis of the ellipse, whereas the center point of the protractor ring 7 remains on the major axis of the ellipse, and a line, designated C, from the axis of the ball 25 to the scribing member 21 passes through the center of the protractor ring. The scribing member thus describes a true ellipse by what is known as the "trammel method."

If the slide 22 is adjusted to represent a distance from the center of the protractor ring 7 corresponding to one-half the minor axis, then the ellipse which will be drawn will have its major axis along line A and its minor axis along line B of FIGURE 5; that is, the major axis of the ellipse will be at 90° to that shown in FIGURE 5. By use of the scale on the protractor various points on the ellipse may be located for various purposes, such as, for example, the spacing of gear teeth.

It should be observed that the scale on the scale bar 10 may be a "half scale" so that the diameters, rather than the half-diameters of the major and minor axes, may be read on the scale.

It will be also observed that a complete ellipse may be drawn in one continuous movement, if one starts the ellipse from a point under the arms 28 and 30.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An elliptic compass, comprising: a first and second means constrained to linear movement along a pair of right-angularly related axes; a protractor ring carried by one of said means and rotatable about an axis perpendicular to the axis of travel of said means; a member extending diametrically across said protractor ring and rotatable therewith; a pair of slides on said member; means for securing said slides at selected points on said member within the boundaries of said protractor ring; and a scribe connected to one of said slides; said other slide being connected to the other of said linearly movable means; said scribe adapted on rotation of said protractor ring to describe an ellipse.

2. An elliptic compass, comprising: a fixed member; a base member connected to said fixed member for linear movement relative thereto; a protractor ring rotatably mounted in said base member; a cross bar carried by said protractor ring for rotation therewith; a pair of slides on said cross bar; a scribing element carried by one of said slides for engaging a surface underlying said protractor ring; extensible and retractable means pivotally connected to the other slide and secured to said fixed member, said means constraining said other slide to linear movement relative to said fixed member generally transverse to the movement of said base member, whereby on rotation of said protractor ring and corresponding travel of said base member and said other slide along their respective linear movements said scribing element describes an ellipse on said underlying surface.

3. An ellipse generating compass, comprising: a bar forming a fixed reference member; a base member connected to said bar for sliding movement along an axis parallel to said bar; a protractor ring journaled on said base member; a slide support secured to and extending diametrically across said protractor ring; a slide member adjustable on said slide support and defining an axis parallel to the axis of rotation of said protractor ring; means for extending and retracting said slide member along a translation axis generally transverse to the axis of movement of said base member upon rotation of said protractor ring and slide support; and a scribe slide also adjustably mounted on said support to describe an ellipse as said protractor ring is rotated causing said base member to reciprocate along its axis and said slide member to extend and retract along its translation axis.

4. An elliptic compass, comprising: a fixed member; a base member connected to said fixed member for linear movement relative thereto; a protractor ring rotatably mounted in said base member; a cross bar carried by said protractor ring for rotation therewith; a pair of slides on said cross bar; a scribing element carried by one of said slides for engaging a surface underlying said protractor ring; extensible and retractable means pivotally connected to the other slide and secured to said fixed member, said means constraining said other slide to linear movement relative to said fixed member generally transverse to the movement of said base member, whereby on rotation of said protractor ring said scribing element describes an ellipse on said underlying surface; and a scale extending diametrically across said protractor ring in proximity to said underlying surface.

5. An ellipse generating compass, comprising: a bar forming a fixed reference member; a base member connected to said bar for sliding movement along an axis parallel to said bar; a protractor ring journaled on said base member; a slide support secured to and extending diametrically across said protractor ring; a slide member adjustable on said slide support and defining an axis parallel to the axis of rotation of said protractor ring; means for extending and retracting said slide member along a translation axis generally transverse to the axis of movement of said base member upon rotation of said protractor ring and slide support; and a scribe slide also adjustably mounted on said support to describe an ellipse as said protractor ring is rotated causing said base member to reciprocate along its axis and said slide member to extend and retract along its translation axis; and a scale member extending diametrically across said protractor ring at the underside thereof.

6. An elliptic compass, comprising: a rotatable ring member; means for effecting translation movement of said ring member along an axis perpendicular to the axis of rotation of said ring member; a slide support fixed to and extending diametrically across said ring member; a pair of slides movable on said slide support to selected fixed positions; a scribe for one of said slides; means pivotally connected to said second slide for constraining said second slide to a translation movement along an axis generally transverse to the translation movement of said ring member; and means for rotating said ring member while permitting translation movements of said ring member and second slides along their respective translation axes.

References Cited in the file of this patent
UNITED STATES PATENTS 2,595,417    Scott _____ May 6, 1952
2,762,126    Shaw _____ Sept. 11, 1956

FOREIGN PATENTS 247,785    Germany _____ June 7, 1912